United States Patent [19]
Woodcock

[11] Patent Number: 5,734,989
[45] Date of Patent: Mar. 31, 1998

[54] ENVIRONMENTALLY CONTROLLED LOCOMOTIVE COMPUTER AND DISPLAY

[75] Inventor: David E. Woodcock, Watertown, N.Y.

[73] Assignee: New York Air Brake Corporation, Watertown, N.Y.

[21] Appl. No.: 946,688

[22] Filed: Sep. 18, 1992

[51] Int. Cl.⁶ ............................................... G06F 7/70
[52] U.S. Cl. ..................... 701/70; 364/484; 303/3; 303/15; 303/20; 246/182 R; 246/182 B; 246/167 R; 340/825.52
[58] Field of Search ................ 364/426.01, 426.02, 364/423.03, 484, 550, 551.01; 303/3, 15, 20, 33, 61, 35; 74/483, 491; 192/1.55, 1.52, 1.56; 246/182, 182 B, 182 R, 167 R, 187 R; 235/150.2; 701/70, 22, 1; 340/679, 870.28, 825.52

[56] References Cited

U.S. PATENT DOCUMENTS

| | | | |
|---|---|---|---|
| 3,975,643 | 8/1976 | Toth | 250/551 |
| 4,042,047 | 8/1977 | Newton et al. | 364/426 |
| 4,085,355 | 4/1978 | Fradella | 318/168 |
| 4,393,485 | 7/1983 | Redden | 367/25 |
| 4,402,810 | 9/1983 | Mosher | 235/150.2 |
| 4,553,723 | 11/1985 | Nichols et al. | 246/182 |
| 4,582,280 | 4/1986 | Nichols et al. | 246/182 |
| 4,652,057 | 3/1987 | Engle et al. | 303/3 |
| 4,859,000 | 8/1989 | Deno et al. | 303/3 |
| 4,904,027 | 2/1990 | Skantar et al. | 303/15 |
| 4,996,655 | 2/1991 | Chadwick et al. | 364/550 |
| 5,144,467 | 9/1992 | Kitajima et al. | 359/124 |
| 5,172,316 | 12/1992 | Root et al. | 364/424.01 |
| 5,249,480 | 10/1993 | Harmon et al. | 74/483 |
| 5,581,472 | 12/1996 | Miller et al. | 364/484 |

*Primary Examiner*—Jacques H. Louis-Jacques
*Attorney, Agent, or Firm*—Barnes & Thornburg

[57] ABSTRACT

To reduce the environmental affects on a locomotive control system, optical couplers connect the brake control handle and propulsion control handle to the computer and connect electromagnetic control valves to the computer.

9 Claims, 8 Drawing Sheets

ENVIRONMENTALLY CONTROLLED LOCOMOTIVE COMPUTER AND DISPLAY

TECHNICAL FIELD

The present invention relates generally to locomotive controls, more specifically to computer locomotive controls and displays.

BACKGROUND ART

Figure 1:
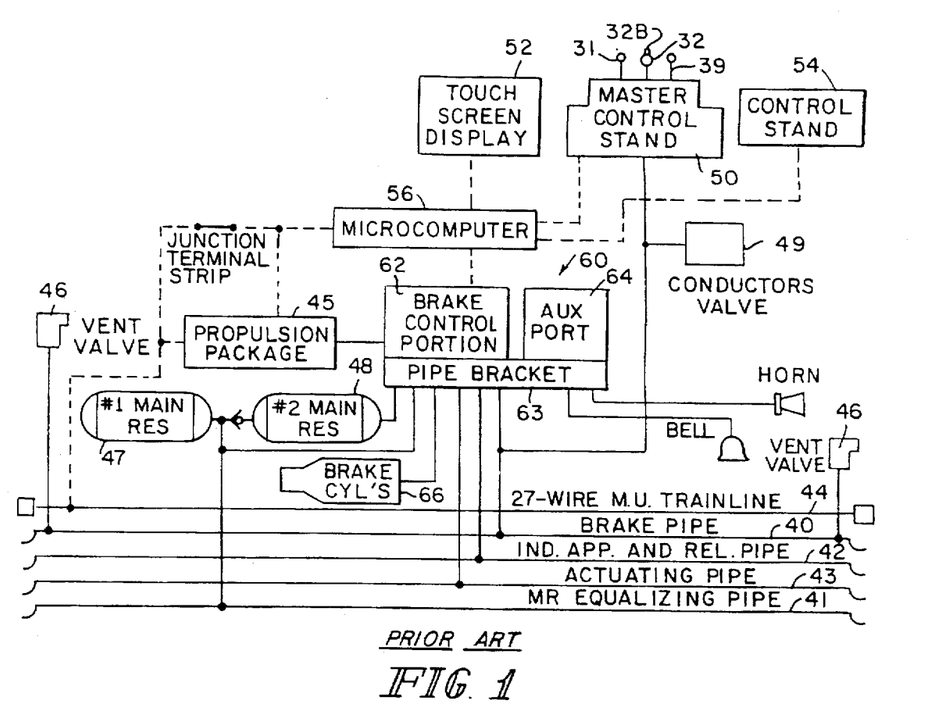
FIG. 1 is a schematic representation of a locomotive control system of the prior art.

Computers have been introduced in locomotive control systems. Not only do they control the braking and the propulsion, but also provide other supervisory functions. Typical examples include U.S. Pat. Nos. 4,402,047 to Newton, et al. and U.S. Pat. No. 4,652,057 to Engle. A more recent example, of computer controlled railroad braking for a locomotive is illustrated in FIG. 1 which corresponds to FIG. 3 of U.S. patent application Ser. No. 07/477,816 filed Dec. 8, 1989 now U.S. Pat. No. 5,172,316, to K. B. Root, et al. Microcomputer 56 receives signals from the control stand 50 which includes automatic brake handle 51, independent brake handle 32 and a throttle or propulsion control handle 39. The microcomputer 56 provides electrical control signals to the brake control portion 62 to operate valves to control the air brake signals. The microcomputer 56 also communicates with a touch screen display 52 and monitors and communicates with other elements and units over the 27-wire multi-unit train line 44.

The environment of a locomotive is very harsh. Not only are the temperature variations between −25° F. to 140° F., but there are substantial electro-magnetic interference (EMI) from the generator and induction motors of the propulsion system. This harsh environment has hampered the computer from receiving accurate signals in which to make determination for a control of the locomotive and train line. For example, the older model brake and propulsion control handles have replaced the cam operated switches with a rheostat to provide signals to the computer. The variations in temperature change the value of the rheostat and therefore would provide inaccurate signals to the computer of the position of the handle.

The screen display 52 is generally a liquid crystal display. Liquid crystal displays are generally operable in the range of 0° F. to 95° F. Even though it will operate in this range, the quality of the display varies greatly over this temperature range. Thus, especially in non air conditioned locomotive cabin, liquid crystal displays, have a limited use.

Another critical element of the computer system is the computer power supply. The power supply regulator is also sensitive to environmental changes. This problem is substantially increased because the power supply must be in a sealed compartment because during servicing, this compartment is flushed with water.

The computer inputs and outputs are connected to various elements of systems throughout the locomotive. These interconnections become a major source for importation of electro-magnetic interference and undesirable power loading. The locomotive brake control system usually includes a series of electro-magnetic fluid valves which operated individually by a control wire running to the control center which generally would include the computer. The resistance of the control line is a limiting factor on the speed of the electro-magnetic valve. Another source of major interference with the computer is from the current loop for the propulsion system provided on the 27-wire train line 44.

Thus, it is an object of the invention to provide an interface to the computer which reduces the errors resulting from the harsh environment which includes temperature and electro-magnetic interference.

Another object of the present invention is to provide an improved environmentally protected power supply for the computer.

Still another object of the present invention is to provide an active, non-loading, isolated interface between the control handles and the computer, and between the train current loop and the computer.

A still even further object of the invention is to provide a liquid crystal display having improved operation in the temperature range of an non air conditioned locomotive cabin.

An even further object of the present invention is to provide an interface between the computer and the electro-magnetic valves which does not adversely effect the operating time of the valve.

Other objects, advantages and novel features of the present invention will become apparent from the following detailed description of the invention when considered in conjunction with the accompanying drawings.

BEST MODES FOR CARRYING OUT THE INVENTION

Figure 2:
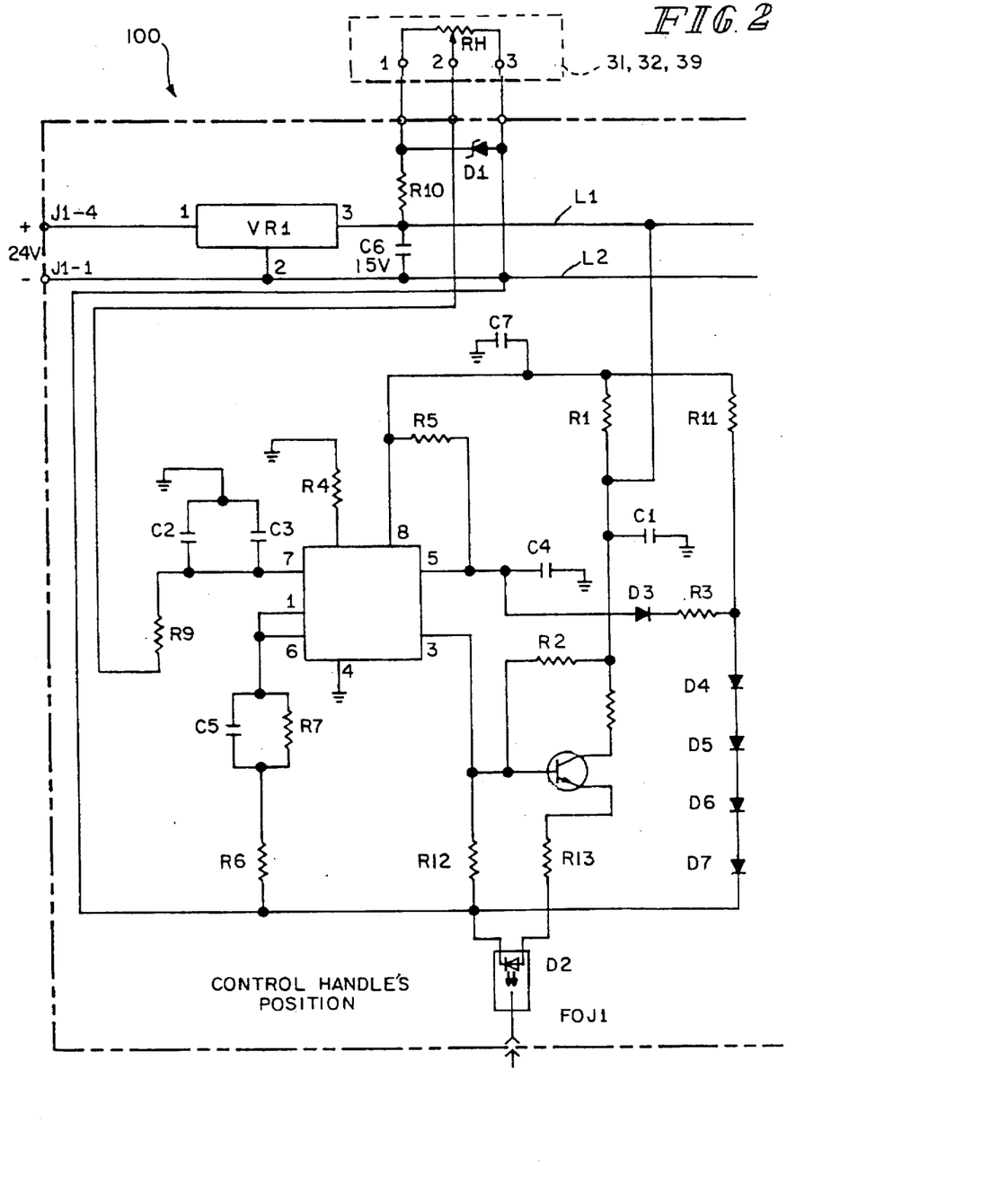
FIG. 2 is a schematic of an optical transmitter to be used with a hand controller according to the principles of the present invention.

In order to reduce the loading on the computer as well as to isolate it from electro-magnetic interference, the interface with the computer uses optical transmitters and receivers interconnected by fiber optics. Also electro optical isolators are used. The reference numbers of the elements of the prior art FIG. 1 will be used and U.S. patent application Ser. No. 07/447,816 filed Dec. 8, 1989 now U.S. Pat. No. 5,172,316, in incorporated herein by reference. The control handles 31, 32 and 39 for the braking and propulsion vary the resistance of a variable resistor RH and provides that as an input to optical transmitter 100. It should be noted that for each of the handles, a separate optical transmitter is provided. A 24 volt input for example, is regulated by voltage regulator VR providing a 15 volt output across lines L1 and L2 to each of the three handle optical transmitters. The terminal 2 of the variable handle resistor RH is connected through resistor R9 as a frequency determine input to the oscillator OSC. The output of the oscillator OSC is provided to a light emitting diode D2 and which provides a variable frequency optical signal representing the position of the control handles as an output to a fiber optic cable. Transistor Q1 with temperature sensitive diodes D5, D6 and D7 provide temperature stabilization to the oscillator OSC. The variable frequency signal and the use of fiber optics minimizes the temperature variation of the signal and provides an optical isolation of the control handles from the computer 56.

Figure 3:
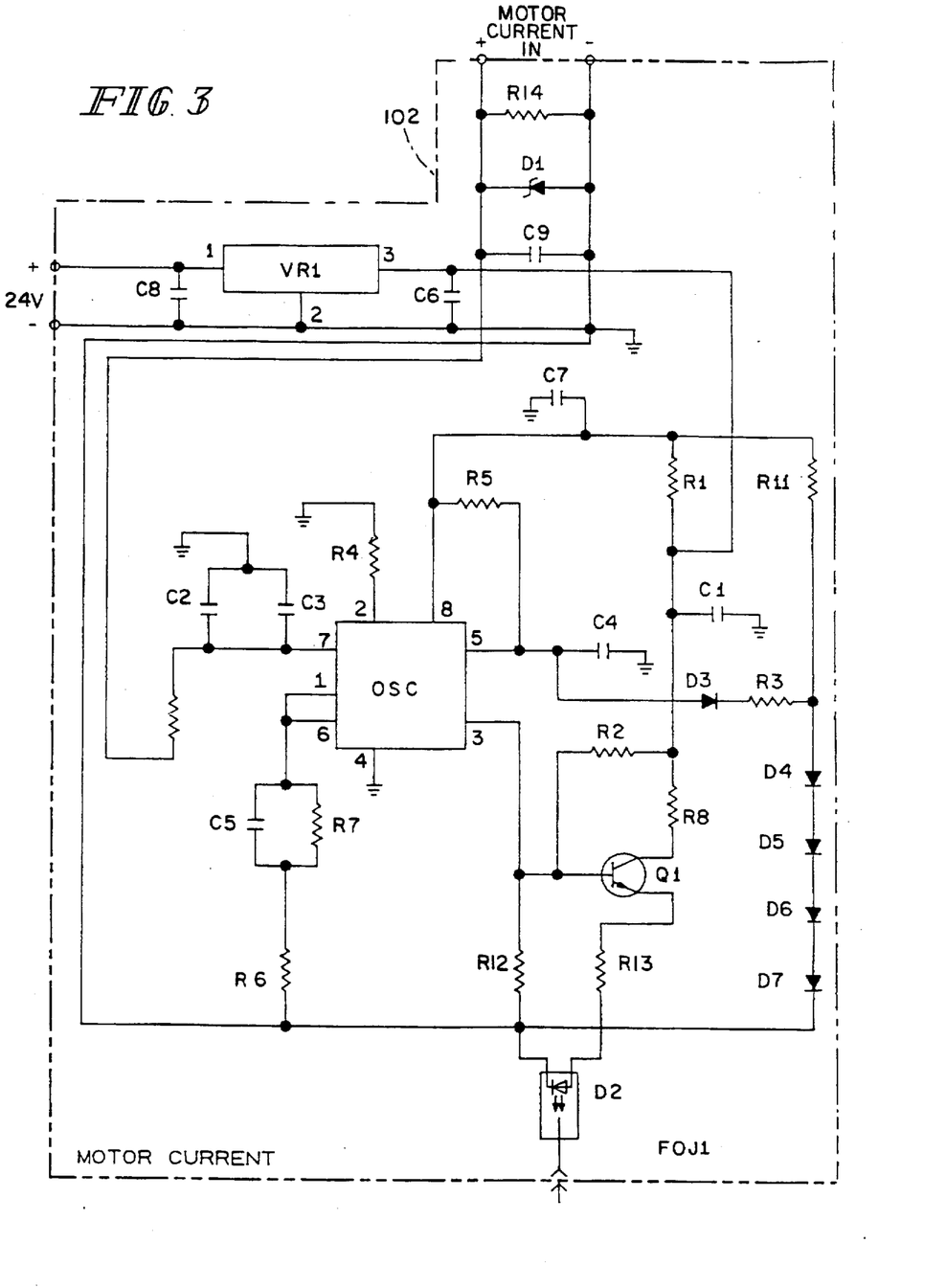
FIG. 3 is a block diagram of an optical transmitter, used for the motor current according to the principles of the present invention.

The basic optical transmitter can be used as a current loop to optical convertor as illustrated by optical transmitter 102 in FIG. 3. The plus and minus terminals of the motor current are provided through resistors R14 and D1 and capacitor C9 to the oscillator OSC through resistor R9. The circuitry converts the motor current into a voltage to control the frequency of the oscillator OSC. The variable frequency signal then drives the light emitting diode D2 to provide a variable frequency optical signal representing the motor current. A typical example of the oscillator is model number LM131H.

Figure 4:
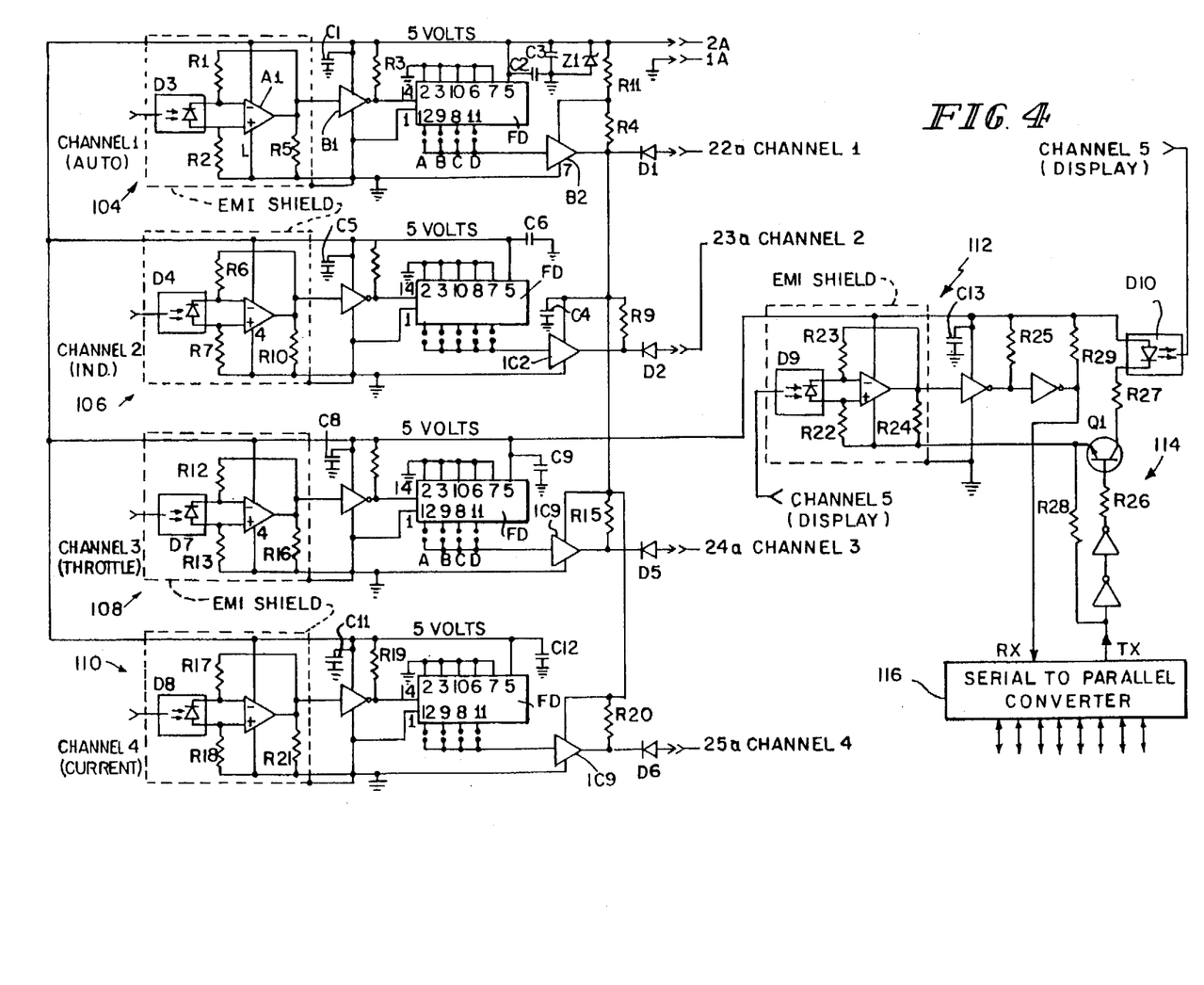
FIG. 4 is a schematic of an optical receiver and transceiver interface for a computer incorporating the principles of the present invention.

The optical receiver which interfaces the fiber optic cable to the computer is illustrated in FIG. 4. The optical interface includes the five optical receivers 104, 106, 108, 110 and 112 and one optical transmitter 114. Optical receiver 104 receives the optical signal for the automatic brake control handle and provides the output on channel 1. Optical receiver 106 receives the optical signal for the independent brake handle and provides an electrical output on channel 2. Optical receiver 108 receives the optical signal for the throttle handle and provides an output on channel 3. Optical receiver 110 receives the optical signal representing the motor current and provides an output on channel 4. Optical receiver 112 receives an optical signal from the liquid crystal display 52 and provides an output to the serial to parallel converter 116 which provides parallel outputs to the computer. The computer also provides an optical signal back to the screen display 52 by optical transmitter 114 connected to the serial output of the serial to parallel converter 116.

The optical receivers 104 through 110 are identical and only 104 will be described in detail. The optical input signals received by photodiode D13 is provided as an input to a frequency divider FD through amplifier A1 and buffer B1. The output of the frequency divider FD is provided through buffer B2 to the diode D1 which is connected to the output port. The frequency divider FD is adjustable to vary the frequency division to match the expected variation in the optical signal and to match it to the acceptable signal range for the computer. This adaptive frequency division allows the use of the complete range of the input to output signal thereby minimizes errors. The output port of the optical receiver is a non-loading optical port generally biasing the output diode D1 off. When a optical signal is received, D1 conducts pulling the output low. This is used in NAND gate logic to provide an appropriate signal to the computer. The use of the diode at the output as well as the optical isolator using an optical transmitter and optical receiver, isolates the computer from external sources of noise as well as providing a no-load input. A typical frequency divider FD would be model number DN5490A.

The optical receiver 112 from the display is generally designed for computer use, and therefore the variable frequency divider FD is not needed. Since the input signal for the optical transmitter 114 is from the computer, further conditioning of the driver for the light emitting diode D10 is not needed. Thus the optical transmitter 114 is substantially simpler than that illustrated in FIGS. 2 and 3.

Figure 5:
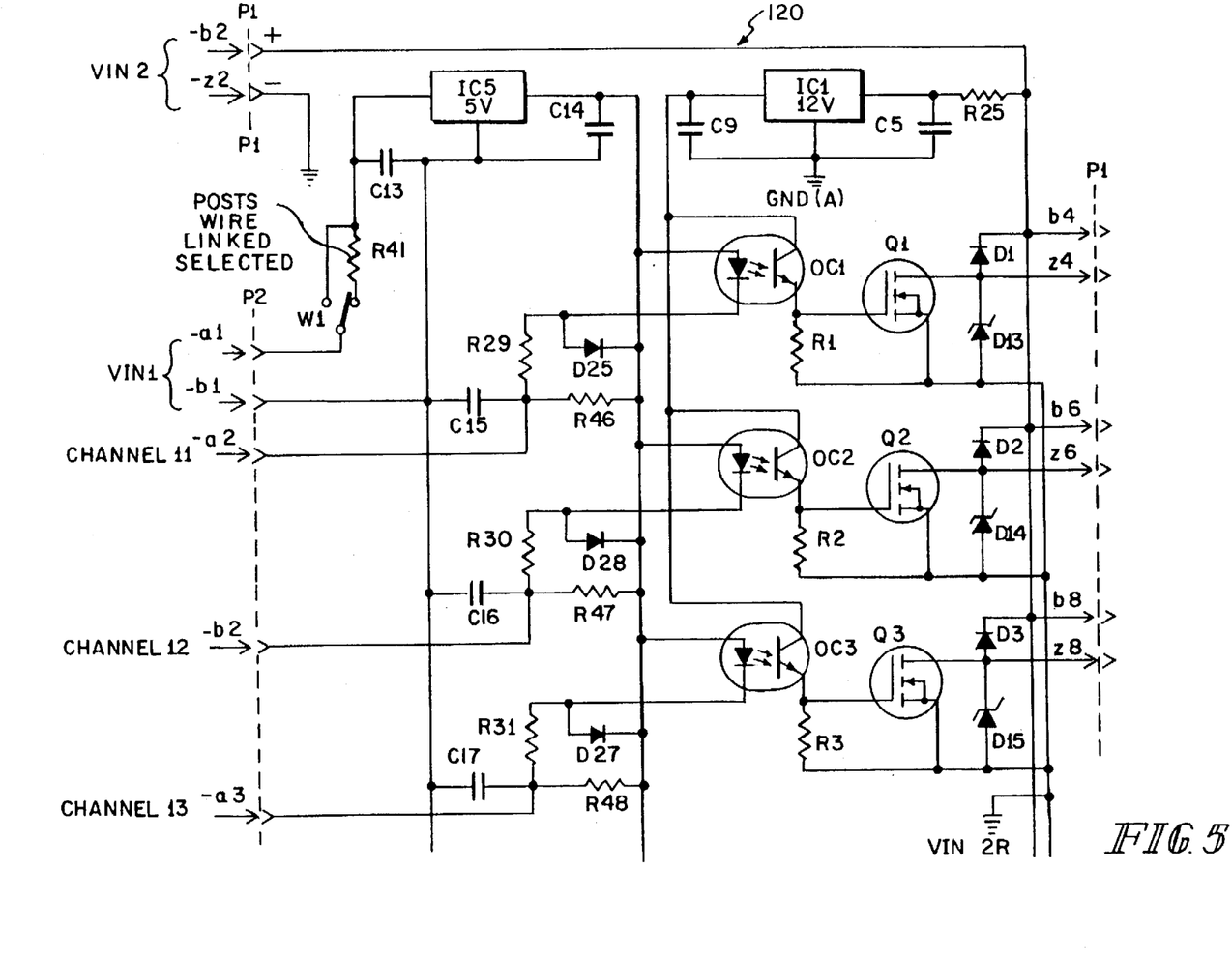
FIG. 5 is a schematic of a isolation driver according to the principles of the present invention.

To reduce the resistance of the lead lines extending from the computer to electro-magnetic valves in the locomotive, and to isolate the computer from the electro-magnetic interference of these valves, an interface driver 120 is illustrated in FIG. 5 for three channels 11, 12 and 13 for three electro-magnetic control valves. Although this is being described with respect to control valves, the drivers may be used for other elements connected to the computer. The interface driver 120 is located as close as possible to the electro-magnetic valves and the individual control wires from the computer are received on channels 11, 12 and 13.

For sake of brevity, the details of channel 11 will be described. The electrical input signal received on channel 11 from the computer is processed by capacitors C15 and resistor R46 and diode D25 to activate and control the light emitting diode portion of an optical coupler OC1. This optical signal is sent by an optical transistor provided as an input through resistor R1 to a field effect transistor Q1. As with the previously discussed optical receivers, the output is maintained high in the absence of an optically coupled signal and is brought low to ground upon receipt of an optically coupled signal. The voltage range on the output is generally in the range of 0.7 volts to ground. By using ground as the logic signal to active the electro mechanical valves, the probability of actuation by error resulting from signal fluctuation or electro-magnetic interference has been eliminated.

Figure 6:
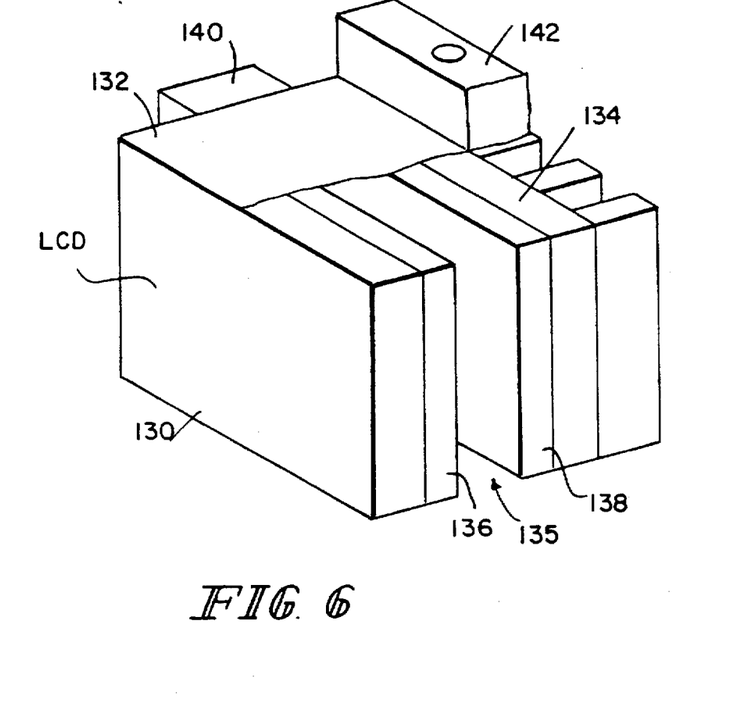
FIG. 6 is a perspective partial cut-away view of a liquid crystal display according to the principles of the present invention.
Figure 7:
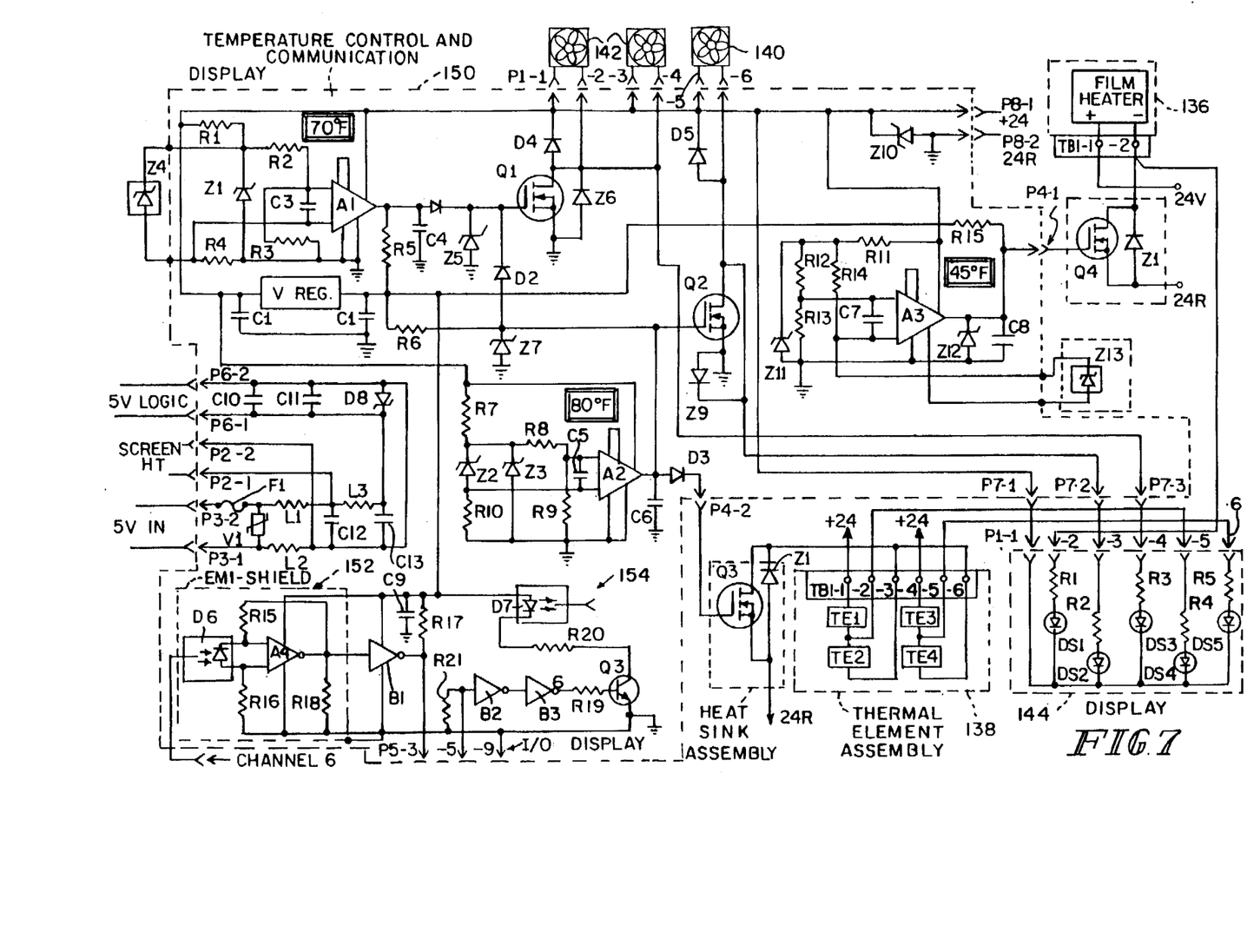
FIG. 7 is a schematic of the temperature control and communication circuitry for the display according to the principles of the present invention.

The display as illustrated in FIG. 6 is a block diagram/schematic representation to show the inter-relationship of the elements to be discussed with respect to the schematic of FIG. 7. The liquid crystal display module 130 is received in a sealed housing 132. The liquid crystal display is susceptible to humidity, dust and temperature variation. Thus it is important that the liquid crystal display be in a sealed container. The liquid crystal display 130 includes not only the display elements, but the input and output controls to drive the display. Mounted to the rear of the housing 132 is a heat sink 134 with a plurality of heat fins. Between the heat sink 134 and the display module 130 is an air space 135. A film heater 136 is mounted to the rear of the crystal display module 130 in the air space 135. An electrical heat sinking or cooling panel 138 is mounted to heat sink 134 in the air space 135. A typical example of the electronic heat sink 134 are Peltier effect devices, which create a temperature gradient to draw the heat from the air space 135 and transfers it efficiently to the heat sink 134. A fan and housing 140 circulates the air in the interior air space 135. A pair of fans are provided in exterior fan housing 142 to cool the fins of the heat sink 134 as well as the housing 132. Only one of the fan housings 142 is shown.

As previously discussed, the potential environment within the locomotive cabin is within the range from −25° F. to 140° F. The control circuitry of FIG. 7 maintains the temperature of the liquid crystal display within the range of approximately 65° to 80° F. The control was designed to maintain a temperature of 72.6° F. plus or minus 4° F. During normal operating conditions, the three fans nor the Peltier effect devices 138 nor the film heater 136 are activated. If the temperature falls below 45° F., the film heater 136 is activated to bring the temperature within the preset range of 72.6°. If the sensed temperature is above 70°, the external fans in housing 142 are activated to increase the heat transfer of the heat sink 134 and to cool the housing 132. If the temperature continues to rise above 80°, the Peltier effect devices 138 and the internal fan 140 are activated. The controls are interlocked such that the exterior fans in housing 142 are always on when the interior fan in housing 140 and the Peltier effect devices 138 are activated.

As will be discussed below, the controls or drivers for the individual elements are designed such as to be fully on above a selected range of input values and to operate linearly within a window of ranges. This provides an initial coarse or high degree of temperature modification followed by a fine or linearly variable temperature modification once the temperature is within the design window until the desired temperature is reached.

The display temperature control and communications circuit is illustrated in FIG. 7 within the dotted line 150. A temperature responsive element shown as a zener diode Z4 provide the temperature sensitive input to operational amplifier A1 which is set to provide an output signal once the outside temperature reaches 75° F. The output drives, transistor Q1 when the exterior temperature is greater than 70° to turn on the exterior fans FNO1 and FNO2 in the exterior fan housing 142. The field effect transistor Q1 is turned on hard once the 70° temperature is reached to turn the fans FNO1 and FNO2 on to their maximum capacity. As the temperature comes close to the 70° range, the signal is decreased and Q1 comes out of saturation and operates in its linear range.

A second amplifier A2 with the temperature sensing zener diode Z2 is activated once Z2 senses temperature greater than 80° F. The amplifier A2 activates the interior air fan FNI and the Peltier effect devices 138 through drivers Q2 and Q3 respectively. As with driver Q1, Q2 and Q3 they are initially driven into their saturated condition to turn the fan FNI and the Peltier effect devices 138 on hard and then subsequently the drivers enter their linear region to fine tune or variably control the fan and the Peltier effect devices.

An exterior temperature sensitive device illustrated as zener diode Z13 senses the temperature and controls the operation amplifier A3 which is activated when the temperature falls below 45° to activate driver Q4 turning on the film heater 136. As with the other drivers, Q4 is controlled initially in the saturated region and subsequently falling into its linear region. While the drivers for the fans Q1 and Q2 are within the display temperature control and communication module 150, the drivers Q3 and Q4 are at the heat sink assembly for the liquid crystal display where the Peltier effect devices 138 and the film heater 136 are located.

A diagnostic indicator 134 having five light emitting diodes is provided at the display 52 to indicate the condition of the temperature modification system. A first light emitting diode DS1 is red and is connected to and activated by driver Q4 for the film heater 136. The second diode DS2 is yellow and is connected to and activated by the driver Q2 for the interior fan FNI. The third diode DS3 is green and is connected to and activated by the driver Q1 for the exterior fans FNO 1 and 2. The final two diodes DS4 and DS5 are amber and are connected to and activated by the Peltier effect devices 138.

The display temperature control and communication module 150 also includes an optical receiver 152 receiving signals over a fiber optic cable from channel 6 of the computer optical interface transmitter 114 of FIG. 4, and an optical transmitter 154 connected by fiber optics to channel 5 of the optical interface receiver 112 of FIG. 4. The optical receiver 152 and optical transmitter 154 are connected to the IO port of the display 52. The optical receiver 152 and the optical transmitter 154 are similar in design to optical transmitter 114 and optical transmitter 112 of FIG. 4.

Figure 8:
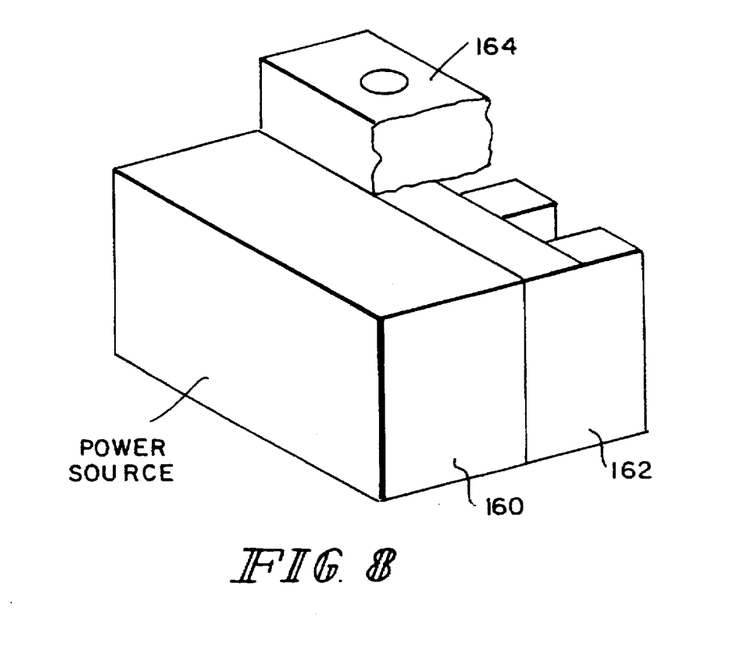
FIG. 8 is a perspective partial cut-away view of a power source according to the principles of the present invention.

The computer power supply is illustrated in FIG. 8 and includes two sealed compartments 160 and 162. The compartment 160 includes the power supply which includes regulator and noise cancellation circuitry and the second compartment 162 includes the heat sink. A fan housing 164 circulates air about the heat sink portion 162. This sealed configuration, although initially increasing the heat susceptibility of the power regulator 160, with the improved heat sink compensates for the sealing. The sealed unit allows hose down of the component with no ill effects to the power system.

Figure 9:
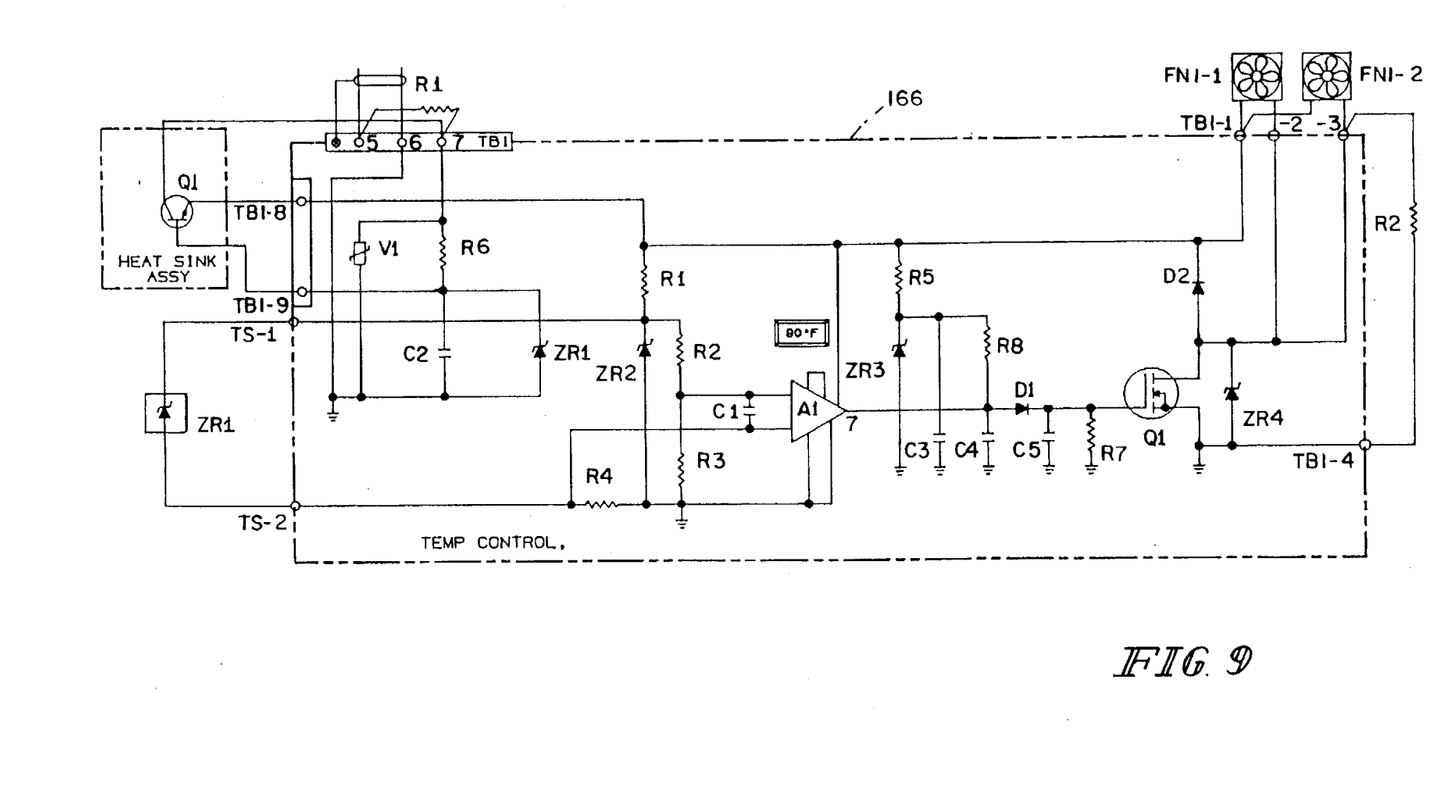
FIG. 9 is a schematic of the temperature control circuitry for the power source according to the principles of the present invention.

A control circuitry similar to the control circuitry for the liquid crystal display is illustrated in FIG. 9. The power supply temperature regulator 166 includes a temperature sensitive element ZR1 connected through operation amplifier A1 to driver Q1. The output of driver Q1 is connected to actuate the fans FNI 1 and FNI 2. Connected and parallel to the output of the driver is the resistor R2. The amplifier A1 is turned on once the temperature sensed by ZR1 is 90° F. As in the previous discussion, driver Q1 initially enters saturation and then once the temperature is within a given range, it enters its linear region. For example, in the range of 100° and above, Q1 is in saturation. Once the temperature returns to 95° Q1 enters its linear region. The resistor R2 maintains the fans FNI 1 and FNI 2 on slowly at all times. This prevents the fans from locking up since they are in a hostile environment. Once Q1 is activated, the resistor R2 is shorted and the fans will be operated by the driver Q2. Thus the housing of FIG. 8 and the control circuit of FIG. 9 provides a sealed power supply with a thermally controlled environment. The fan control 166 provides three different speeds, namely slow air circulation, high air circulation and proportional controlled there between.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A locomotive electrical control system including a brake control handle and a propulsion control handle, said system comprising:

optical transmitter means for transmitting variable frequency optical signals representing positions of said control handles;

optical receiver means for receiving and converting said variable frequency optical signals into electrical handle position signals;

said optical receiver means including means for producing non loading electrical handle position signals; and a computer means for receiving said electrical handle position signals and generating braking and propulsion control signals.

2. A system according to claim 1, wherein said brake control handle includes an automatic brake control handle and an independent brake control handle; and an optical transmitter means and optical receiver means for each of said control handles.

3. A system according to claim 1, including an optical transceiver means for communicating with a display and a serial-to-parallel converter connecting said transceiver and said computer means.

4. A system according to claim 1, including fiber optics connecting said optical transmitter means and said optical receiver means.

5. A locomotive electrical control system including a brake control handle; electro-magnetic control valves, a computer for generating control signals for said valves, and wires connecting said computer to said valves, said system further comprising:

an optical isolator means at said valves for transmitting said control signals while electrically isolating said computer and said valves and minimizing lead resistance to said valves; and said optical isolator means includes output means for outputting said control signals as ground.

6. A locomotive electrical control system including a brake control handle and a propulsion control handle, said system comprising:

first optical transmitter means for transmitting variable frequency optical signals representing positions of said control handles;

first optical receiver means for receiving and converting said variable frequency optical signals into electrical handle position signals;

a computer means for receiving said electrical handle position signals and generating braking and propulsion control signals;

a second optical transmitter means and second optical receiver means for interfacing said computer means to a standard train signaling wire harness; and said second optical transmitter means including means for varying the frequency of the optical signal to represent motor loop current.

7. A locomotive electrical control system including a brake control handle and a propulsion control handle, said system comprising:

optical transmitter means for transmitting variable frequency optical signals representing positions of said control handles;

optical receiver means for receiving and converting said variable frequency optical signals into electrical handle position signals;

said optical receiver including means for adjustably changing the frequency of said variable frequency optical signal; and a computer means for receiving said electrical handle position signals and generating braking and propulsion control signals.

8. A locomotive electrical control system including a brake control handle and a propulsion control handle, said system comprising:

optical transmitter means for transmitting variable frequency optical signals representing positions of said control handles;

said optical transmitter means including an oscillator having a frequency determining circuit, means for connecting said control handles to said frequency determining circuit and heat sensitive means connected to said oscillator for temperature stabilization;

optical receiver means for receiving and converting said variable frequency optical signals into electrical handle position signals; and a computer means for receiving said electrical handle position signals and generating braking and propulsion control signals.

9. A system according to claim 8, wherein said heat sensitive means connects said oscillator to an optical transmitter.

* * * * *